US009614551B2

(12) United States Patent
Mueck et al.

(10) Patent No.: US 9,614,551 B2
(45) Date of Patent: Apr. 4, 2017

(54) DEVICE, SYSTEM AND METHOD OF CONFIGURING A RADIO TRANSCEIVER

(71) Applicant: INTEL IP CORPORATION, Santa Clara, CA (US)

(72) Inventors: Markus Dominik Mueck, Neubiberg (DE); Vladimir Ivanov, St. Petersburg (RU)

(73) Assignee: INTEL IP CORPORATION, Santa Clara, CA (US)

( * ) Notice: Subject to any disclaimer, the term of this patent is extended or adjusted under 35 U.S.C. 154(b) by 115 days.

(21) Appl. No.: 14/506,194

(22) Filed: Oct. 3, 2014

(65) Prior Publication Data

US 2015/0244400 A1    Aug. 27, 2015

Related U.S. Application Data

(60) Provisional application No. 61/943,948, filed on Feb. 24, 2014.

(51) Int. Cl.
*H04B 7/00*    (2006.01)
*H04B 1/00*    (2006.01)
*H04B 1/401*   (2015.01)
*H04B 1/3827*  (2015.01)

(52) U.S. Cl.
CPC ......... *H04B 1/0057* (2013.01); *H04B 1/3838* (2013.01); *H04B 1/401* (2013.01)

(58) Field of Classification Search
None
See application file for complete search history.

(56) References Cited

U.S. PATENT DOCUMENTS

| | | | |
|---|---|---|---|
| 7,406,328 B2 * | 7/2008 | Wallace | H04B 1/38 370/331 |
| 8,428,650 B2 * | 4/2013 | Pottenger | H04B 1/0003 375/219 |
| 9,307,409 B2 * | 4/2016 | Sheikh | H04L 63/10 |
| 2002/0144134 A1 | 10/2002 | Watanabe et al. | |
| 2004/0162023 A1 | 8/2004 | Cho | |
| 2004/0242261 A1 * | 12/2004 | Fette | H04B 1/0003 455/550.1 |
| 2005/0059427 A1 | 3/2005 | Wallace | |
| 2006/0052124 A1 | 3/2006 | Pottenger et al. | |

(Continued)

FOREIGN PATENT DOCUMENTS

WO    2015034526 A1    3/2015
WO    2015099740 A1    7/2015

OTHER PUBLICATIONS

ETSI TS 103 095, Reconfigurable Radio Systems (RRS); Radio Reconfiguration Related Architecture for Mobile Devices.
(Continued)

*Primary Examiner* — Tuan A Tran
(74) *Attorney, Agent, or Firm* — Schwabe, Williamson & Wyatt, P.C.

(57) ABSTRACT

A device, system and method of configuring a radio transceiver are described. In particular, there is described an RF front-end for transmitting wireless communication signals, the RF front-end comprising a plurality of elements, and wherein the RF front-end is configured to obtain an RF protection class signal and to selectively apply one or more of the plurality of elements to a transmitted signal based on the obtained RF protection class signal.

19 Claims, 14 Drawing Sheets

(56) References Cited

U.S. PATENT DOCUMENTS

| | | |
|---|---|---|
| 2009/0156129 A1 | 6/2009 | Hassan et al. |
| 2014/0038636 A1* | 2/2014 | Karr ..................... G01S 13/825 455/456.1 |
| 2015/0178112 A1 | 6/2015 | Ivanov et al. |
| 2015/0207680 A1 | 7/2015 | Ivanov et al. |
| 2016/0248464 A1 | 8/2016 | Alavi et al. |

OTHER PUBLICATIONS

Wireless Innovation Forum, Top 10 Most Wanted Wireless Innovations; WINNF-11-P-0014, version V1.0.1, Oct. 7, 2011.

Software Communication Architecture Specification; Version 4.0; Feb. 28, 2012; JTRS.

Revision of the R&TTE Directive; http://eur-lex.europa.eu/LexUriServ/LexUriServ.do?uri=COM:2012:0584:FIN:EN:PDF.

M. Mueck et al.; "Future of Wireless Communication: RadioApps and Related Security and Radio Computer Framework"; IEEE Magazine on Wireless Communications; vol. 19, Issue 4; 2012; pp. 9-16.

Korean Intellectual Property Office; International Search Report and Written Opinion for PCT App. No. PCT/US2015/016794 dated May 18, 2015; 14 pages.

\* cited by examiner

DEVICE, SYSTEM AND METHOD OF CONFIGURING A RADIO TRANSCEIVER

TECHNICAL FIELD

Embodiments described herein generally relate to the field of wireless communications and, more particularly, to a reconfigurable radio transceiver.

BACKGROUND OF THE INVENTION

Radio transceivers are typically designed to support one, or small number of, fixed radio access technologies (RAT). For example, a radio transceiver may support WiFi technology, or specific UTRAN access network technologies such as a $3^{rd}$ Generation Partnership Project 3G or Long Term Evolution (LTE) RAT.

Reconfigurable radio transceivers have been proposed that provide a radio hardware platform that is reconfigurable in such a way that essential radio characteristics (carrier frequencies, spectrum bandwidth, modulation technique, coding technique, output power levels, etc.) may be changed to allow the radio transceiver to be reconfigured to support different RATs.

It is important that reconfigurable radio transceivers are able to meet the same performance requirements as current transceivers that support a few fixed predefined RATs, in order that they are able to meet the certification requirements laid down by national regulators in each country. In particular, any reconfigurations must also meet the certification requirements before being deployed onto devices used on national networks.

However, recertification of reconfigurable radio transceivers is typically expensive and time consuming.

BRIEF DESCRIPTION OF THE DRAWING

Aspects, features and advantages of embodiments of the present invention will become apparent from the following description of the invention in reference to the appended drawings in which like numerals denote like elements and in which.

DETAILED DESCRIPTION OF EMBODIMENTS

Figure 1:
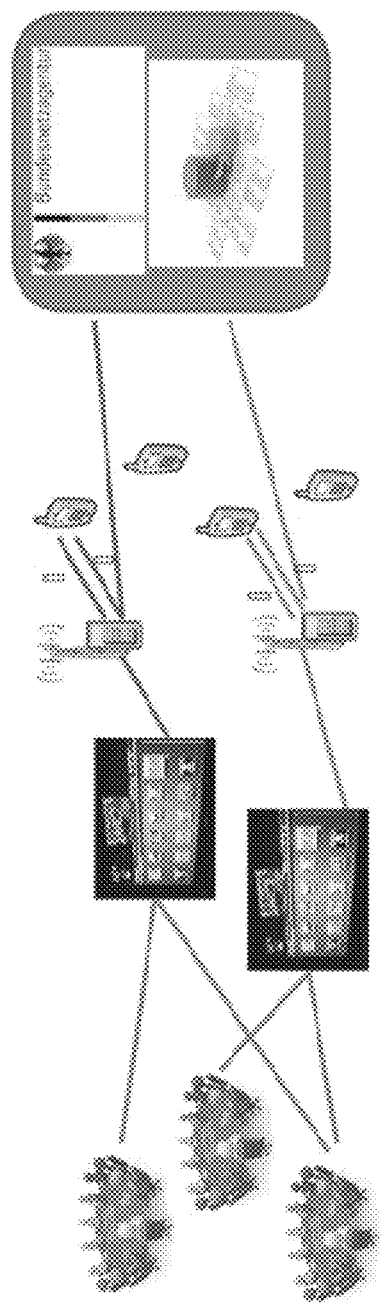
FIG. 1 illustrates the RadioApps Framework according to the revised R&TTE Directive.

Illustrative embodiments of the present disclosure include, but are not limited to, methods, systems, and apparatuses for providing reconfigurable radio platforms.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "NB" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (ET-DMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), cellular wide area radio communication technology (which may include e.g. a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

Some demonstrative embodiments may be used in conjunction with a cellular communication network communicating over Long Term Evolution (LTE) communication network. Other embodiments may be implemented utilizing any other suitable cellular communication network.

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, fixed or mobile client devices, relays, base stations, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Reconfigurable radio platforms have been developed and provide for reconfiguration of a radio device to operate with different radio access technologies. Currently none reconfigurable wireless terminals are produced which may only be able to support a few fixed radio access technologies (RAT).

Reconfigurable Radio assumes that the radio hardware platform is reconfigurable in such a way that the essential radio characteristics (carrier frequencies, spectrum bandwidth, modulation technique, coding technique, output power levels, and etc.) can be changed. Radio hardware platforms are heterogeneous by nature and include computational elements with different level of programmability or reconfiguration.

While software based reconfiguration has been studied for many years, the recent revision of the underlying regulation framework in Europe for radio devices (the so-called R&TTE Directive) enforces the market introduction of software reconfiguration technologies with great political support. It can be expected that the revision of the R&TTE Directive, due to be in force in Europe by 2014, will trigger the proliferation of software reconfiguration of wireless equipment. Standardization efforts are ongoing under the ETSI, and the vision introduced by the ETSI is illustrated in FIG. 1.

While in this disclosure the term reconfigurable radio has been used, the skilled person will understand that this term encompasses a range of levels of reconfigurability, i.e. partly software reconfigurable, reconfigurable through firmware update, reconfigurable through RVM (Radio Virtual Machine) code updates (either source code, Intermediate Representation (IR) code or executable code), etc. Furthermore, it will be understood that the level of reconfigurability may be defined by a certain party, e.g. the manufacturer (in order to limit the level of "openness" of the concerned radio platform).

As illustrated in FIG. 1, new software components for reconfiguring radio devices, so-called RadioApps, can be produced by independent developers and made available to Mobile Device Users to provide new features that may affect the radio characteristics of the concerned mobile devices. Individual users may install different combinations of RadioApps to provide a desired mix of capabilities on a mobile device. In order to avoid unpredictable impacts on wireless networks, each RadioApp must be certified for use on the network (i.e. tested to ensure correct operation, none interference, etc.).

In the ETSI vision framework, an outstanding issue is how to minimize the development effort for new RadioApps and how to minimize certification overhead. In practice, there may be RadioApps which modify the radio behavior more or less substantially: if the modifications of the radio parameters do not introduce a risk for interference to other mobile systems, the inherent checks/re-certification steps for new RadioApps components may be quite "lightweight". If the risks, on the other hand, are high (e.g., some reconfiguration software bugs could theoretically lead to massive interference to other equipment/systems), the inherent checks/re-certification steps for new RadioApps components need to be more thorough.

According to some embodiments, RF protection classes are introduced which provide for different levels of flexibility/configurability for RadioApps. For example, a developer can choose one target RF protection class (which adds/removes protection filters, etc.) for a new RadioApp and thus chooses a trade-off between RF front-end power efficiency/flexibility and re-certification requirements. A new RadioApp running under a high-protection RF class may require a very light-weight (or none at all) recertification process while a new RadioApp running under a low-protection (or unprotected) RF class will need to undergo substantial re-certification checks.

Figure 2:
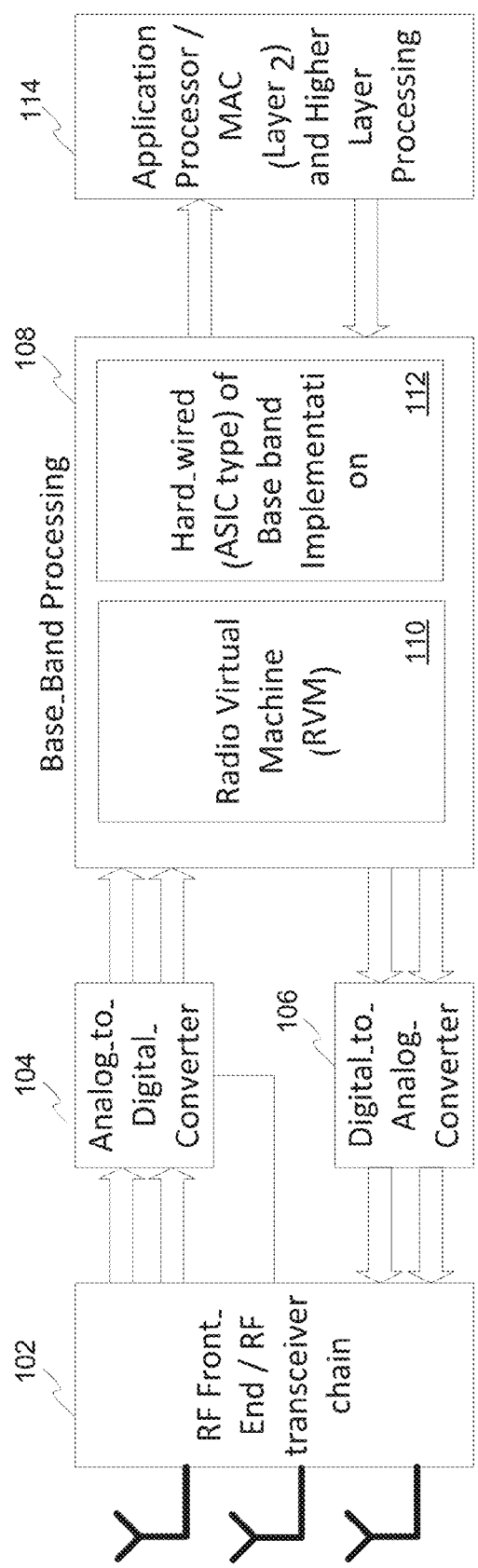
FIG. 2 is a block diagram of a reconfigurable radio equipment architecture.

FIG. 2 illustrates a typical reconfigurable radio equipment architecture 100. The architecture of FIG. 2 comprises an RF front-end 102 that is coupled to base-band processing 108 via A/D and D/A converters 104, 106. A higher level processing layer 114 provides user accessible functionality of the radio equipment device and is coupled to the base-band processing 108. Base-band processing 108 comprises a Radio Virtual Machine (RVM) 110 and Hard-wired base band functionality 112.

The radio equipment architecture of FIG. 2 allows for a certain level of reconfiguration by the execution of software components, RadioApps, on the RVM. However, in this arrangement reconfiguration is limited to functionality within the base-band processing 108. The customization/reconfiguration available through the RVM 110 may be dependent on base-band protection classes.

Note that the Base-Band processing part 108 comprises a so-called Radio Virtual Machine (RVM) 110, which is a controlled execution environment for software affecting the radio characteristics of a Mobile Device. A preferred RVM approach is for example detailed in PCT/US2013/058654 (8 Sep. 2013) which is herein incorporated by reference. In the framework of this disclosure, it is assumed that reconfiguration software (so-called RadioApps) is loaded onto the Radio Virtual Machine 110. In practice, different ways of enabling reconfiguration can be envisaged, such as for example software reconfiguration through firmware update, reconfiguration through provision of software to digital signal processors (DSPs) or application processors (APs) supporting Base-Band processing or through provision software for reconfiguration of flexible hard-wired blocks allowing for (some limited) software based change of their behavior.

Base-Band protection classes have been introduced to provide limitations on base-band functionality available to RadioApps to simply (re)certification of such software components. Such existing techniques only provide interference protection from a base-band perspective. However, it has been discovered that often it is the RF-front-end that can lead to the introduction of unwanted out-of-band radiation or similar due to a poor parameterization and due to erroneous input signals.

According to some embodiments, Base-Band 108 protection classes are extended by providing RF front-end protection mechanisms. In this arrangement, final certification complexity depends on a combination of the selected base-band protection mechanisms and the selected of protection mechanisms.

RF protection classes, i.e. additional filters, limitation of output power levels, etc. can be added as needed to provide mechanisms that can prevent malfunctioning software components to create interference to other neighbouring systems. Similar to the RVM (Base-Band) protection classes the RadioApp (Software Component) developers will be able to choose among a set of available protection classes and the final certification complexity depends on the protection level: A new RadioApp software component used in combination with a high protection class will require a more lightweight certification process while a new RadioApp software component being used without any protection for out-of-band radiation or similar will require a higher level of protection.

Figure 3:
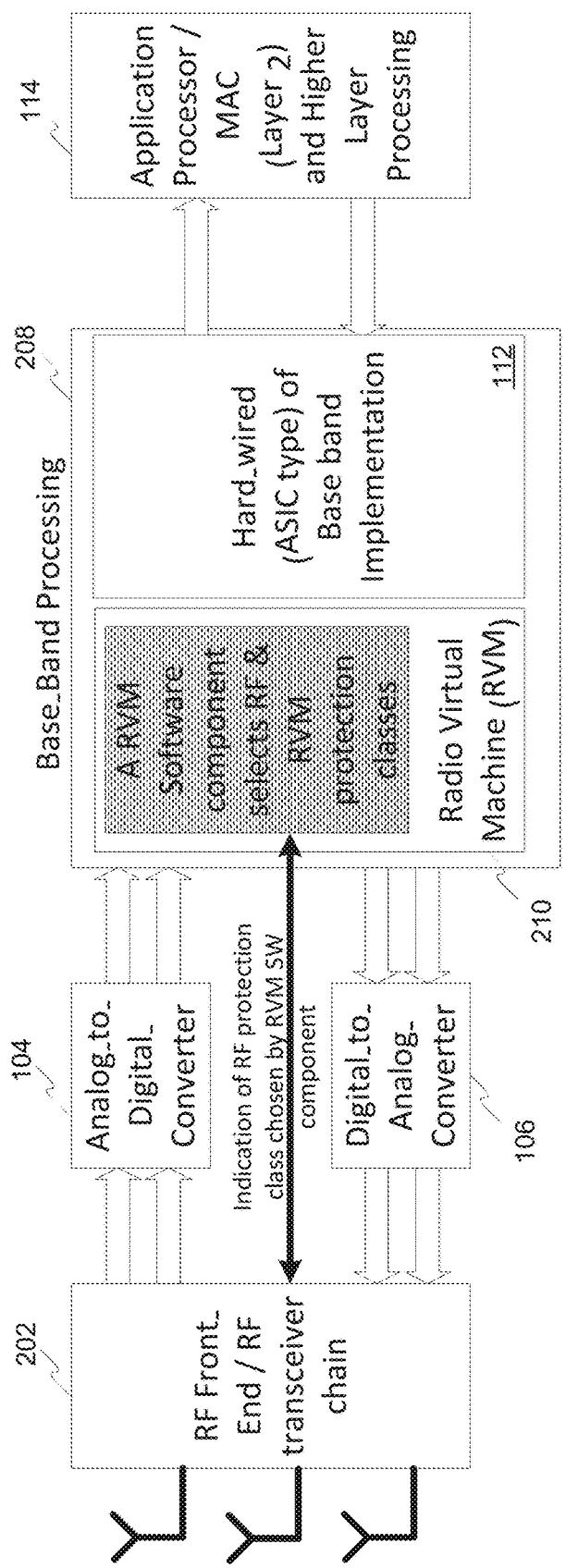
FIG. 3 is a block diagram of a reconfigurable radio equipment architecture according to some embodiments.

FIG. 3 illustrates a radio equipment architecture 200 that has been modified to support RF protection classes in accordance with some embodiments. The architecture 200 of FIG. 3 is similar to that of FIG. 2 but has been modified so that the RF front-end 202 receives an indication of RF protection class associated with an RVM software component 216 executing on the RVM 210.

Based on the received RF protection class indication, the RF front-end 202 applies different filters, power limiting elements, or other protection elements as required. The RF protection classes may be used in conjunction with Base-Band (RVM) protection classes.

The use of RF protection classes extends base-band protection by providing RF protection in the RF front-end and by proposing a final level of device certification complexity following a joint selection of base-band (RVM) and RF front-end protection.

In the framework of this disclosure, a mobile device system environment is assumed as illustrated in FIG. 3. Of course, such as system model can refer to any radio equipment that is software reconfigurable, such as Base Stations, Access Points, Mobile Devices, Tablets, Smartphones, etc.

In the framework of this disclosure, it is proposed that a RadioApps Software developer can choose one among multiple available protection classes for code to be executed on the Radio Virtual machine 210 (or on any other suitable execution environment as listed above). It is proposed that there are protection classes to be selected in the RF front-end 202 and the RVM 210 itself. Depending on the combination of chosen RF & RVM protection classes, the required re-certification process of the software reconfigurable radio platform will be more or less complex. The RadioApp developer therefore has to choose among a trade-off: A higher level of RF & RVM protection will lead to a lighter and low-cost re-certification process while the level of flexibility of the target mobile device is reduced. On the other hand, a lower level of RF & RVM protection will allow for more features in RadioApps but the required re-certification process will most likely be more complex and more costly.

In the framework of this disclosure, three example protection levels are introduced for the RF front-end 202 and the RVM 210. The corresponding levels and proposed consequences for the limitation of the RadioApps feature sets are given in the table below:

| Proposed protection level | Proposed limitation in RVM feature set |
| --- | --- |
| RVM_protection_none | For the development of a new RadioApp, the RVM allows for the full usage of all available functionalities and features. The RadioApp developer has access to the maximum level of flexibility in the base-band processing. |
| RVM_protection_medium | For the development of a new RadioApp, the RVM allows for limited usage of available functionalities and features. The RadioApp developer has access to a medium level of flexibility in the base-band processing.<br>Typical limitations on the base-band level may include the following: Limited possibility to change the bandwidth and the carrier frequency of the radio signal (e.g., the RadioApp developer may choose among a pre-defined set of configurations), limited possibility to change the modulation (e.g., modulation schemes like OFDM(A) may be mandated), limited possibility to change the output power levels (e.g., a maximum output power level is mandated), limited possibility to choose amplitude levels of time/frequency domain samples (e.g., some maximum |

Figure 4:
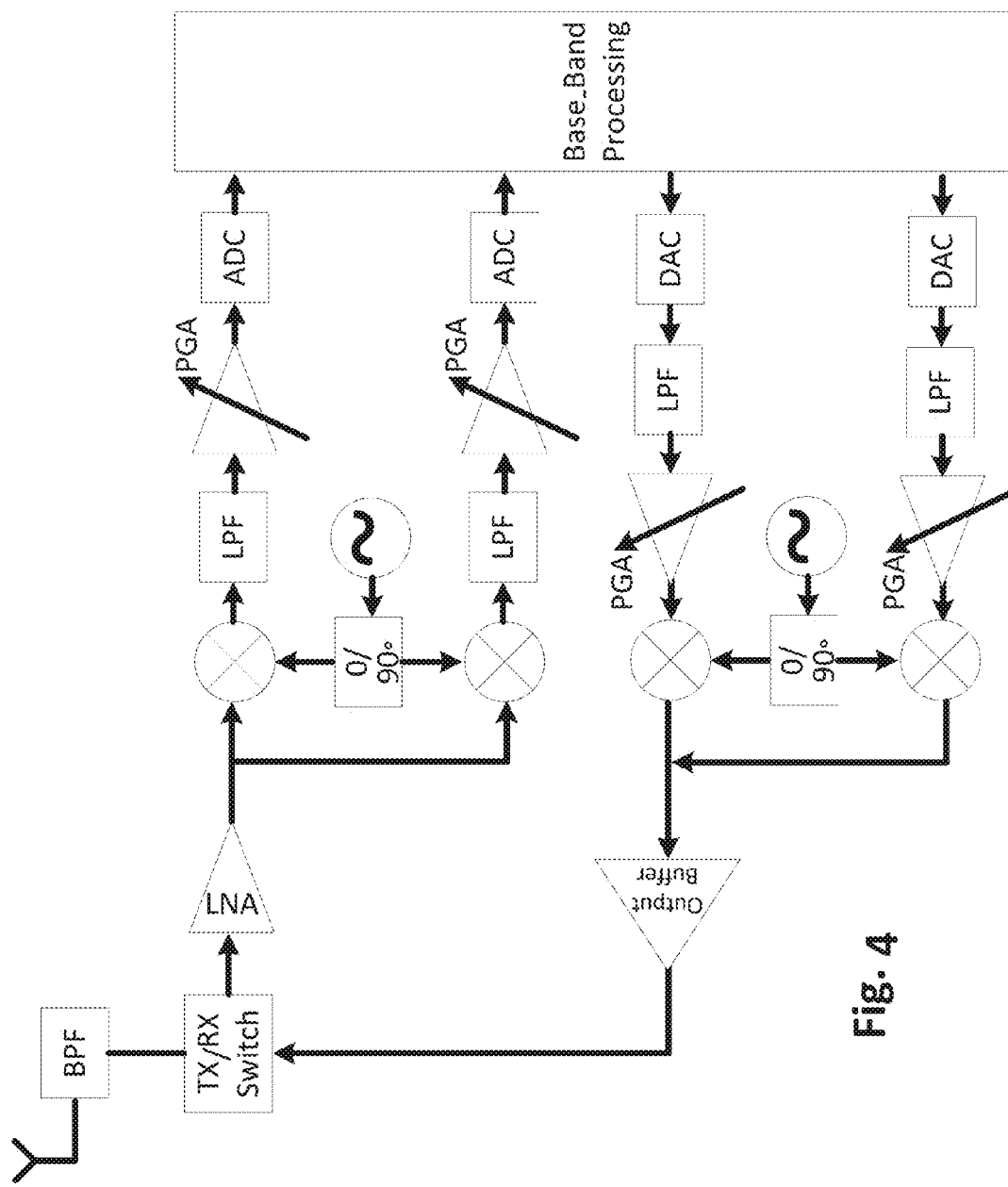
FIG. 4 is a block diagram of a RF transceiver architecture without specific protection mechanisms.

| Proposed protection level | Proposed limitation in RVM feature set |
|---|---|
| | amplitude levels for time/frequency domain may be mandated), limited possibility to select OFDM sub-carriers (e.g., DC carrier may not be used, upper/lower frequency carriers need to remain unused, limited possibility to select pilots and pilot carriers, etc.), limited possibility to modify MIMO (Multiple-Input Multiple-Output multi-antenna) schemes (e.g., simple mechanisms like antenna selection may be possible but novel more advanced features such as spatial division multiplexing, Space-Time/Frequency-Block-Coding, etc. may require the selection of a lower RVM protection level), limited possibility to change header sequences/symbols and pilot/learning sequences/symbols, etc. However, this RVM protection class will typically allow full flexibility for changing the Forward-Error-Correction (FEC) schemes (e.g., Turbo Codes, LDPC codes, Fountain codes, Convolutional Codes, puncturing mechanisms for changing the code rate, interleaving mechanisms that may be optimized for the target Code (such as Turbo/LDPC code), etc.) or data scrambling schemes or user data encryption/decryption schemes, etc. Also, there is typically full access to RX chain features, such as de-modulation, interference suppression, FEC decoding, MIMO decoding, etc. |
| RVM_protection_high | In the highest RVM protection class, only very restrictive access to RVM functionalities and features is available to RadioApp developers. In return, the selection of such a protection level will typically lead to a very light-weight (or even none at all) re-certification process for target devices executing the new RadioApp code. Typically, the highest RVM protection class allows only for RadioApps that cannot create interference to other radio devices and systems. Typically, in this class the RadioApp developer only has access to the RX chain features such as de-modulation, interference suppression, FEC decoding, MIMO decoding, de-cryption, etc. Some limited access to transmit-chain features may also be possible such as antenna selection, Forward-Error-Correction (FEC) schemes (e.g., Turbo Codes, LDPC codes, Fountain codes, Convolutional Codes, puncturing mechanisms for changing the code rate, interleaving mechanisms that may be optimized for the target Code (such as Turbo/LDPC code), etc.) or data scrambling schemes or user data encryption/decryption schemes, etc. Typically, modifications of the modulation, the radio parameters (signal bandwidth, usage of carriers, etc.), the choice of the MIMO scheme and similar are not possible. |
| RF_protection_none | In the lowest RF protection class, typically a standard RF transceiver chain (or RF front-end) is used that does not provide any specific protection. A typical RF transceiver chain architecture is illustrated in FIG. 4. |
| RF_protection_medium | In the medium RF protection class, typically a standard RF transceiver is enriched by a highly selective low-pass filter and possibly a highly selective band-pass filter which ensures that even a "poor" base-band signal (e.g., a base-band signal which has poor out-of-band radiation characteristics, i.e. interference may be created to other devices and systems) remains strictly band-limited and does not create interference to any neighboring devices and/or systems.<br>FIG. 5 illustrates a RF transceiver chain architecture that has been modified to include the highly selective low-pass and band-pass filters. |
| RF_protection_high | In the highest RF protection class, typically a RF transceiver of medium protection level is enriched by features of limiting the output power levels and/or limiting the time domain amplitude levels.<br>Alternatively, the new power and maximum time domain amplitude limitation circuits can also be added in the I/Q transmission chain.<br>FIGS. 6 and 7 illustrate the described alternative arrangements for providing output power levels and time domain amplitude level limitation. |

Figure 5:
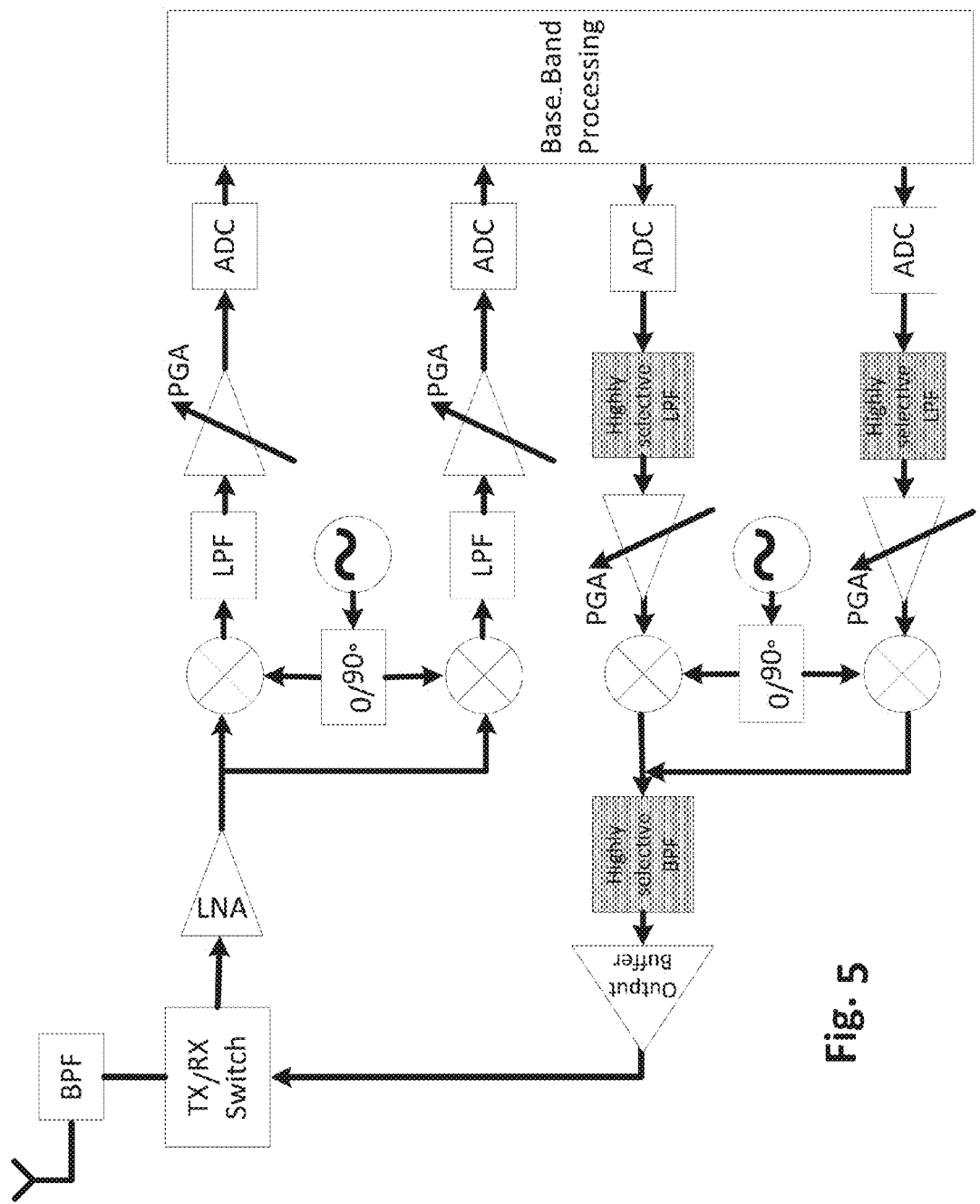
FIG. 5 is a block diagram of a RF transceiver architecture with out-of-band protection mechanisms according to some embodiments.
Figure 6:
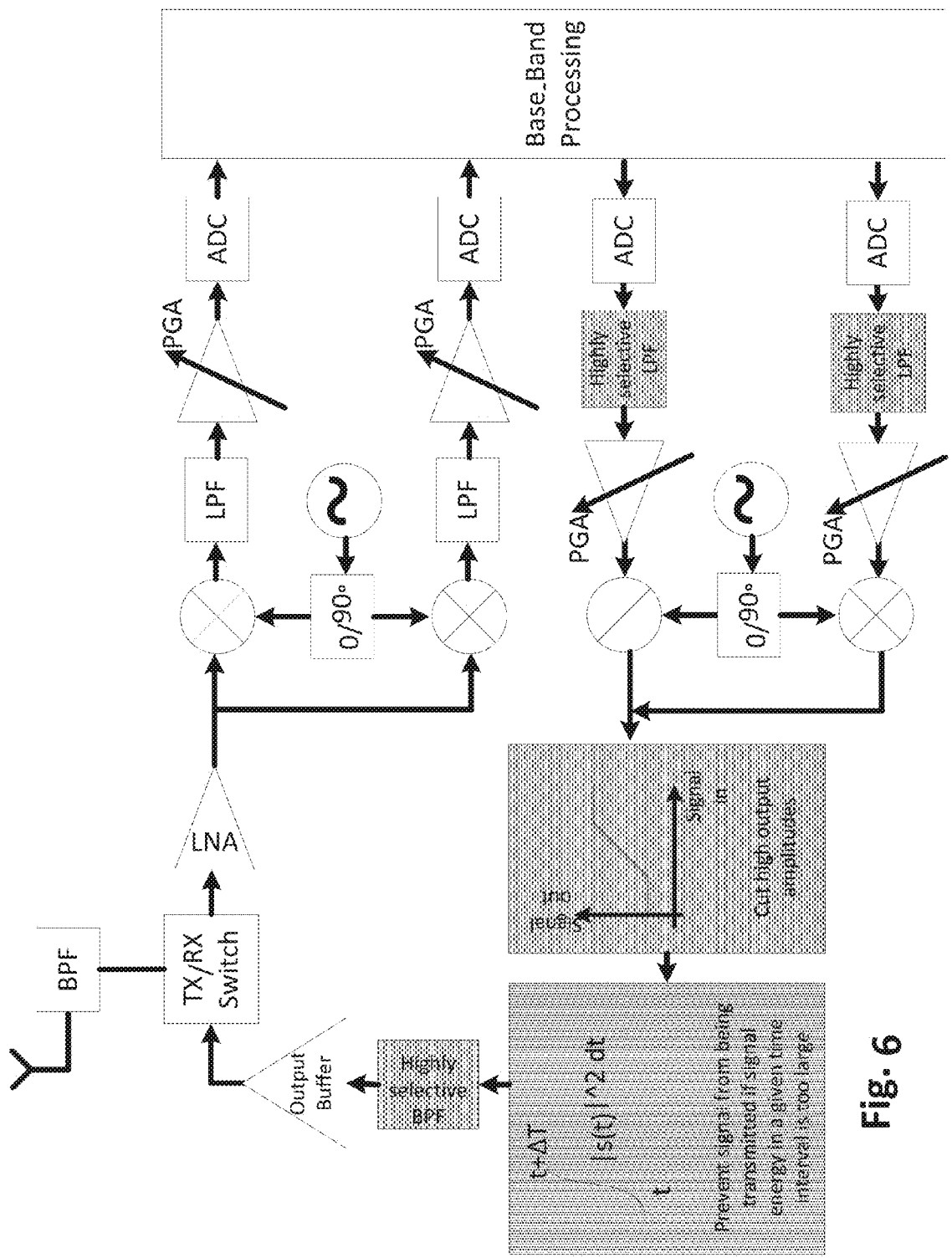
FIG. 6 is a block diagram of a RF transceiver architecture with out-of-band protection, maximum time domain amplitude and maximum power output mechanisms according to some embodiments.
Figure 7:
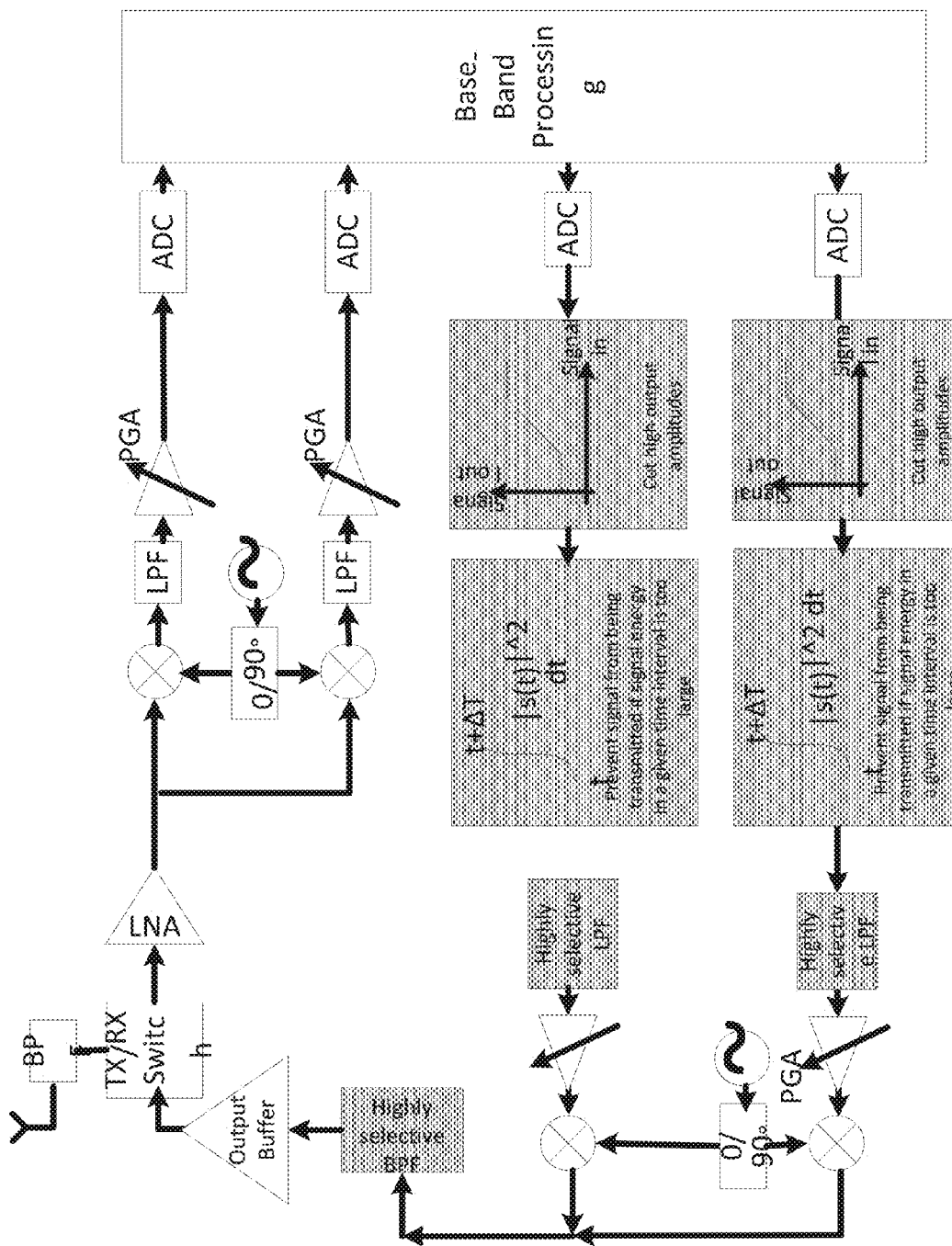
FIG. 7 is a block diagram of an alternative RF transceiver architecture with out-of-band protection, maximum time domain amplitude and maximum power output mechanisms according to some embodiments
Figure 8:
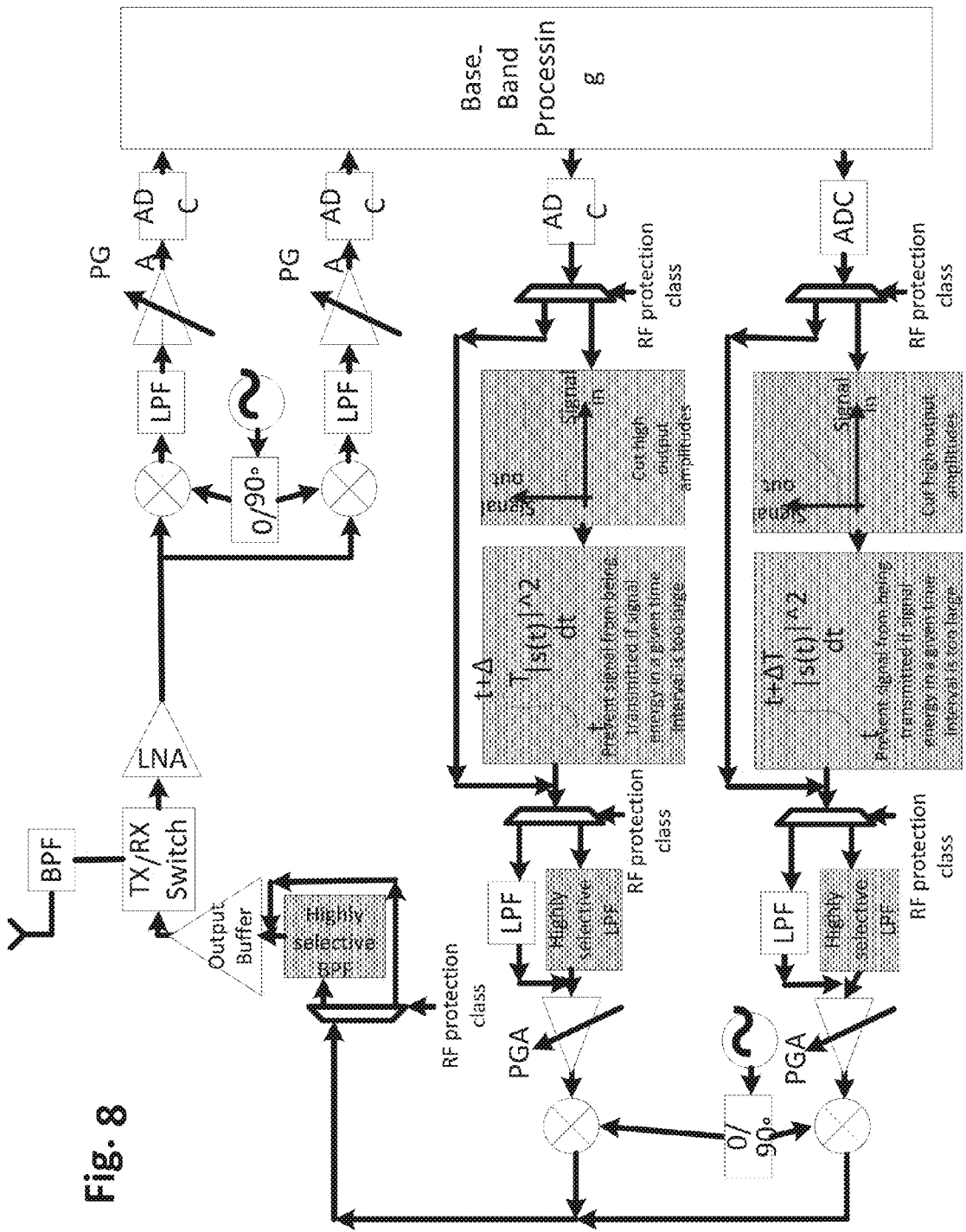
FIG. 8 is a block diagram of a RF transceiver architecture allowing selective application of protection elements.
Figure 9:
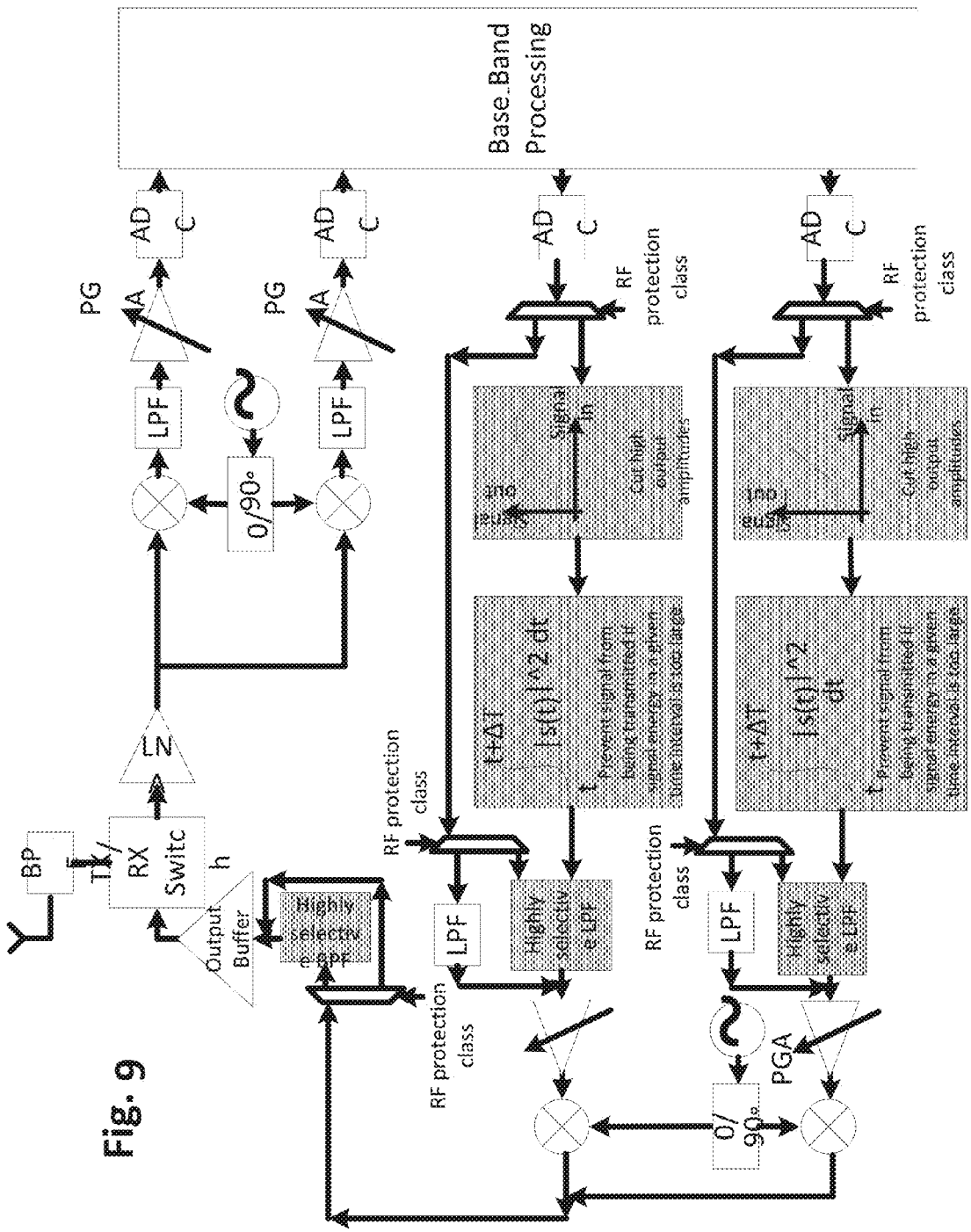
FIG. 9 is a block diagram of a further RF transceiver architecture allowing selective application of protection elements.

The new components highlighted in FIG. 5 to FIG. 7 may be added through multiplexers such that they can be activated/deactivated based on the required RF protection class indication associated with the RVM software component currently being executed. Example architectures in which the protection elements are coupled via multiplexors is illustrated in FIGS. 8 and 9.

Figure 10:
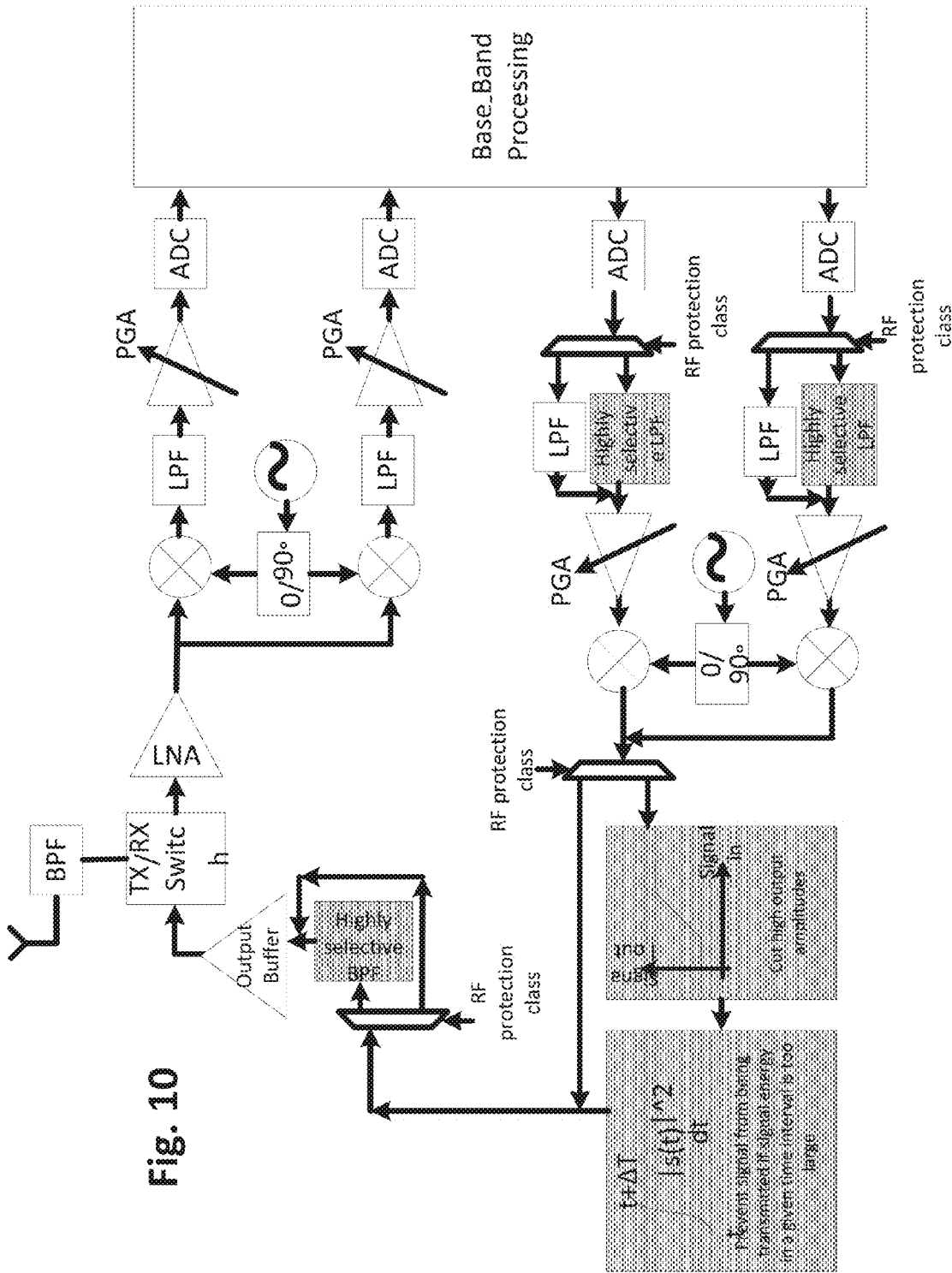
FIG. 10 is a block diagram of a yet further RF transceiver architecture allowing selective application of protection elements

According to some embodiments, the output power limitation and maximum amplitude limitation mechanisms may be implemented after the up conversion stage as illustrated in FIG. 10.

Figure 11:
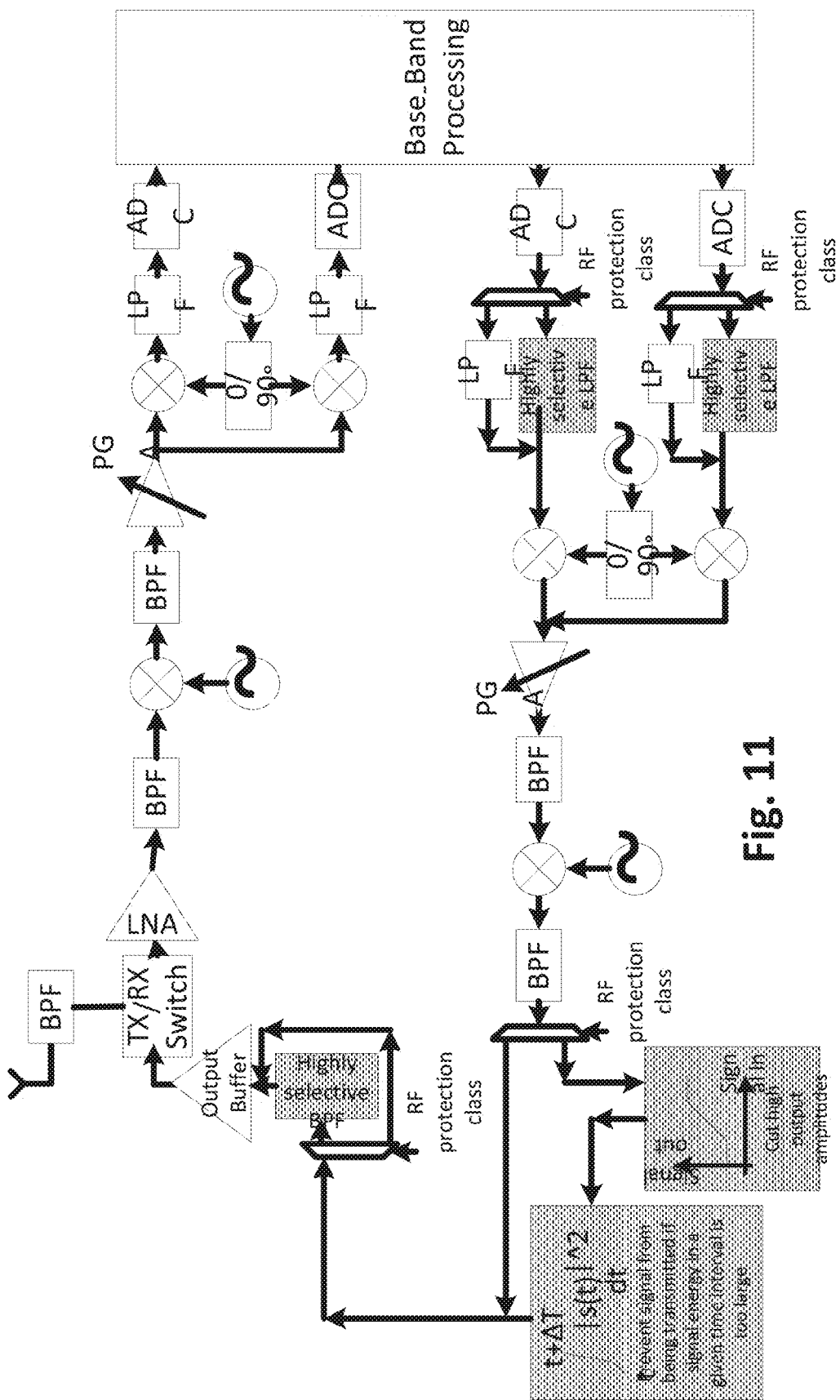
FIG. 11 is a block diagram of a heterodyne RF transceiver architecture allowing selective application of protection elements.

It should be noted that the above proposed modifications to conventional homodyne (Direct-Conversion or Zero-IF) architectures are also applicable to heterodyne architectures. The principle is illustrated in FIG. 11 by applying changes outlined in FIG. 10 to a heterodyne architecture.

Figure 12:
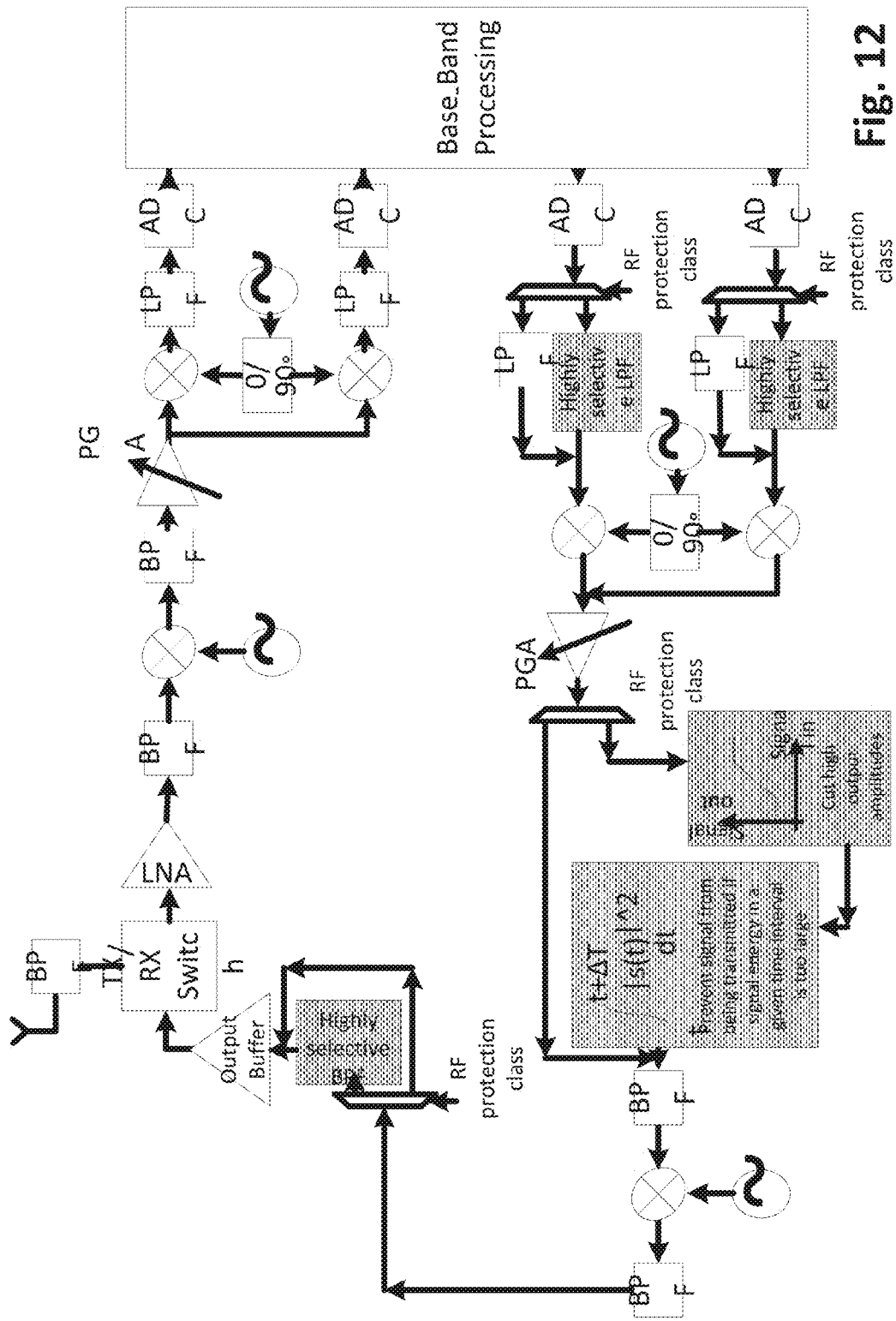
FIG. 12 is a block diagram of an alternative heterodyne RF transceiver architecture allowing selective application of protection elements.

According to some embodiments, the power and output amplitude limitations can be performed in the Intermediate Frequency domain as illustrated in FIG. 12.

While in the above discussion, the disclosed protection elements have been described as being within the RF front-end, in some implementations the RF protection mechanisms may be provided on an external circuit coupled to the RF front-end, for example as part of a Power Amplifier, etc. coupled to the RF transceiver chain.

Depending on the combination of RVM protection class and RF front-end protection class, the required re-certification for devices operating the new target RadioApp will be more or less complex and costly. This re-certification of the target mobile platform typically needs to be performed before the new RadioApp is put onto the market, for example through an online RadioApp sales platform, similar to that illustrated in FIG. 1. The expected costs and complexity for (re)certification of RadioApps according to selected RVM and RF protection classes is outlined in the table below:

| RVM protection class | RF front-end protection class | Expected re-certification effort/cost |
|---|---|---|
| RVM_protection_none | RF_protection_none | Full re-certification required since neither an RVM nor RF protection mechanism is applied. The re-certification is expected to be complex and costly. |
| | RF_protection_medium | Although there is no protection on an RVM level, the RF front-end will ensure out-of-band protection. A reduced re-certification process is expected to be sufficient and the cost as well as complexity is expected to be lower compared to the unprotected case above. |
| | RF_protection_high | Although there is no protection on an RVM level, the RF front-end will ensure the highest level of protection. Therefore, it is unlikely that the device will provide interference to neighbouring band systems - however, no guarantee can be given for the correct operation within the target band. Therefore, a light re-certification process is expected to be sufficient. The cost as well as complexity is expected to be lower compared to the two cases above. |
| RVM_protection_medium | RF_protection_none | While the RF front-end is providing no protection at all, the RVM protection will ensure that no highly risky signal modifications are possible. A slightly reduced re-certification process (compared to the full-fledged re-certification) is expected to be sufficient and the cost as well as complexity is expected to be low. |
| | RF_protection_medium | Both, the RVM and RF front-end protection levels are medium. I.e., the RVM protection will ensure that no highly risky signal modifications are possible and the RF protection will ensure out-of-band protection. A reduced re-certification process is expected to be |

-continued

| RVM protection class | RF front-end protection class | Expected re-certification effort/cost |
|---|---|---|
| | | sufficient and the cost as well as complexity is expected to be low. |
| | RF_protection_high | The RF front-end is providing the highest level of protection and the RVM protection will ensure that no highly risky signal modifications are possible. Therefore, it is unlikely that the device will provide interference to neighbouring band systems - and also the correct operation within the target band is highly likely through the RVM protection mechanisms. Therefore, a light re-certification process is expected to be sufficient. The cost as well as complexity is expected to be low. |
| RVM_protection_high | RF_protection_none | While the RF front-end is providing no protection at all, the highest level of RVM protection will ensure that no major signal modifications are possible. Therefore, it is unlikely that the device will provide interference to neighbouring and in-band systems. Therefore, a light re-certification process is expected to be sufficient. The cost as well as complexity is expected to be low. |
| | RF_protection_medium | While the RF front-end is providing a medium protection level (ensuring that no out-of-band interference can happen), the highest level of RVM protection will ensure that no major signal modifications are possible. Therefore, it is unlikely that the device will provide interference to neighbouring and in-band systems. Therefore, a very light re-certification process is expected to be sufficient. The cost as well as complexity is expected to be low. |
| | RF_protection_high | With the RVM protection level being highest and the RF front-end protection level being highest, there is very little room for the RadioApp developer to create interference to other devices or systems through software bugs, malicious RVM code or similar. Therefore, a very light (or even none at all) re-certification process is expected to be sufficient. The cost as well as complexity is expected to be low to negligible. |

The processes required for re-certification of mobile devices operating a target RadioApp will be mandated by the concerned National Regulation Authorities.

Figure 13:
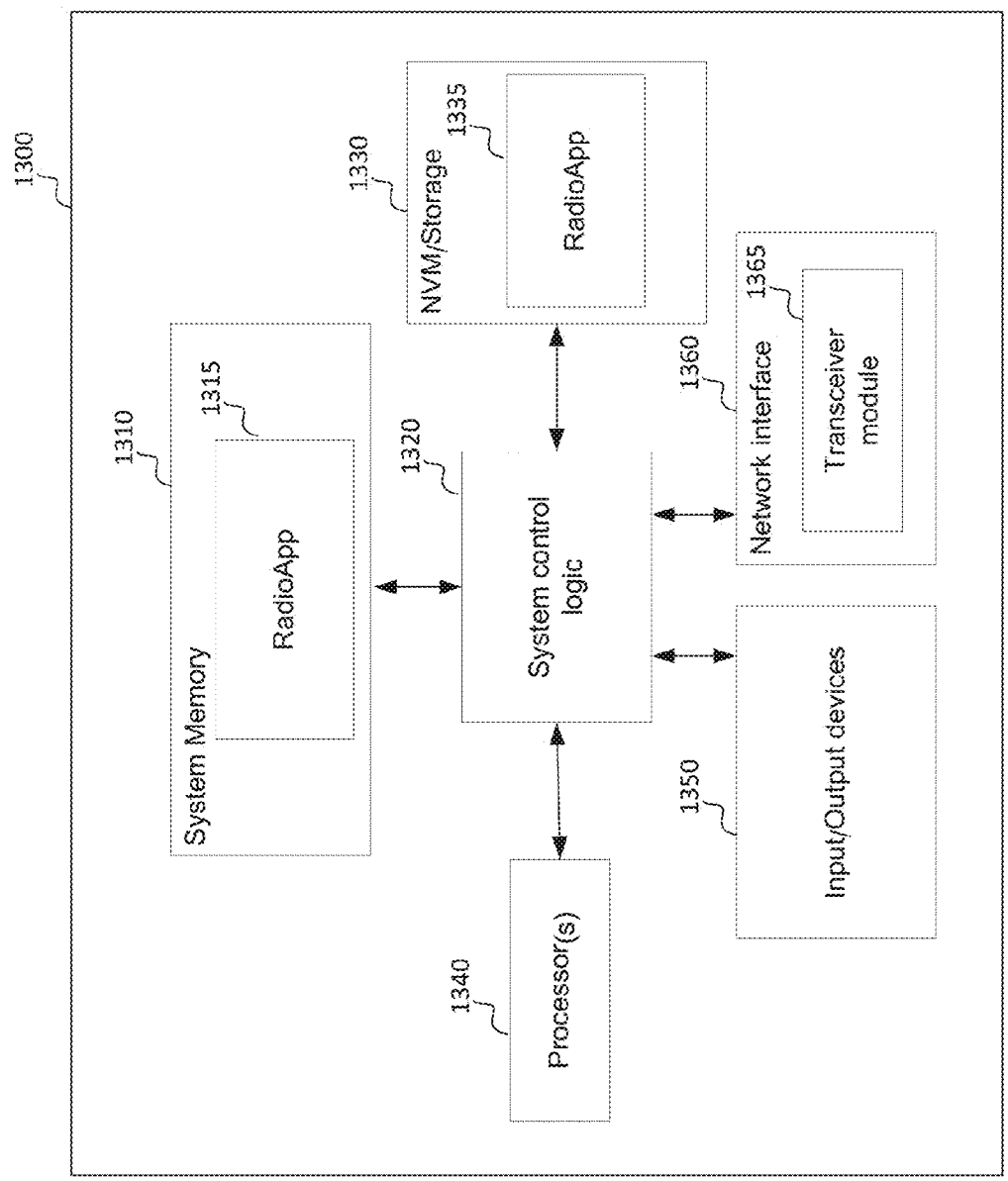
FIG. 13 is a block diagram showing an example system in accordance with various embodiments.

The radio equipment architecture 200 described herein may be implemented into a system using any suitable hardware and/or software to configure as desired. FIG. 13 illustrates, for one embodiment, an example system 1300 comprising one or more processor(s) 1340, system control logic 1320 coupled with at least one of the processor(s) 1340, system memory 1310 coupled with system control logic 1320, non-volatile memory (NVM)/storage 1330 coupled with system control logic 1320, and a network interface 1360 coupled with system control logic 1320. The system control logic 1320 may also be coupled to Input/Output devices 1350.

Processor(s) 1340 may include one or more single-core or multi-core processors. Processor(s) 1340 may include any combination of general-purpose processors and dedicated processors (e.g., graphics processors, application processors, baseband processors, etc.). Processors 1340 may be operable to carry out the above described methods, using suitable instructions or programs (i.e. operate via use of processor, or other logic, instructions). The instructions may be stored in system memory 1310, audio processor memory portion 1315, or additionally or alternatively may be stored in (NVM)/storage 1330, as RadioApp portion 1335.

System control logic 1320 for one embodiment may include any suitable interface controllers to provide for any suitable interface to at least one of the processor(s) 1340 and/or to any suitable device or component in communication with system control logic 1320.

System control logic 1320 for one embodiment may include one or more memory controller(s) (not shown) to provide an interface to system memory 610. System memory 1310 may be used to load and store data and/or instructions, for example, for system 1300. System memory 1310 for one embodiment may include any suitable volatile memory, such as suitable dynamic random access memory (DRAM), for example.

NVM/storage 1330 may include one or more tangible, non-transitory computer-readable media used to store data and/or instructions, for example. NVM/storage 1330 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1330 may include a storage resource physically part of a device on which the system 1300 is installed or it may be accessible by, but not necessarily a part of, the device. For example, the NVM/storage 1330 may be accessed over a network via the network interface 1360.

System memory 1310 and NVM/storage 1330 may respectively include, in particular, temporal and persistent copies of, for example, the RadioApp instructions portions 1315 and 1335, respectively. Instructions portions 1315 and 1335 may include instructions that when executed by at least one of the processor(s) 1340 result in the system 1300 if the method(s) of any embodiment, as described herein. In some embodiments, instruction portions 1315 and 1335, or hardware, firmware, and/or software components thereof, may additionally/alternatively be located in the system control logic 1320, the network interface 1360, and/or the processor(s) 1340.

Network interface 1360 may have a transceiver module 1365 to provide a radio interface for system 1300 to communicate over one or more network(s) (e.g. wireless communication network) and/or with any other suitable device. In various embodiments, the transceiver 1365 may be integrated with other components of system 1300. For example, the transceiver 1365 may include a processor of the processor(s) 1340, memory of the system memory 1310, and NVM/Storage of NVM/Storage 1330. Network interface 1360 may include any suitable hardware and/or firmware. Network interface 1360 may be operatively coupled to a plurality of antennas to provide a multiple input, multiple output radio interface. Network interface 1360 for one embodiment may include, for example, a network adapter, a wireless network adapter, a telephone modem, and/or a wireless modem.

For one embodiment, at least one of the processor(s) 1340 may be packaged together with logic for one or more controller(s) of system control logic 1320. For one embodiment, at least one of the processor(s) 1340 may be packaged together with logic for one or more controllers of system control logic 1320 to form a System in Package (SiP). For one embodiment, at least one of the processor(s) 1340 may be integrated on the same die with logic for one or more controller(s) of system control logic 1320. For one embodiment, at least one of the processor(s) 1340 may be integrated on the same die with logic for one or more controller(s) of system control logic 1320 to form a System on Chip (SoC).

In various embodiments, the I/O devices 1350 may include user interfaces designed to enable user interaction with the system 1300, peripheral component interfaces designed to enable peripheral component interaction with sensors designed to determine environmental conditions and/or location information related to the system 1300.

Figure 14:
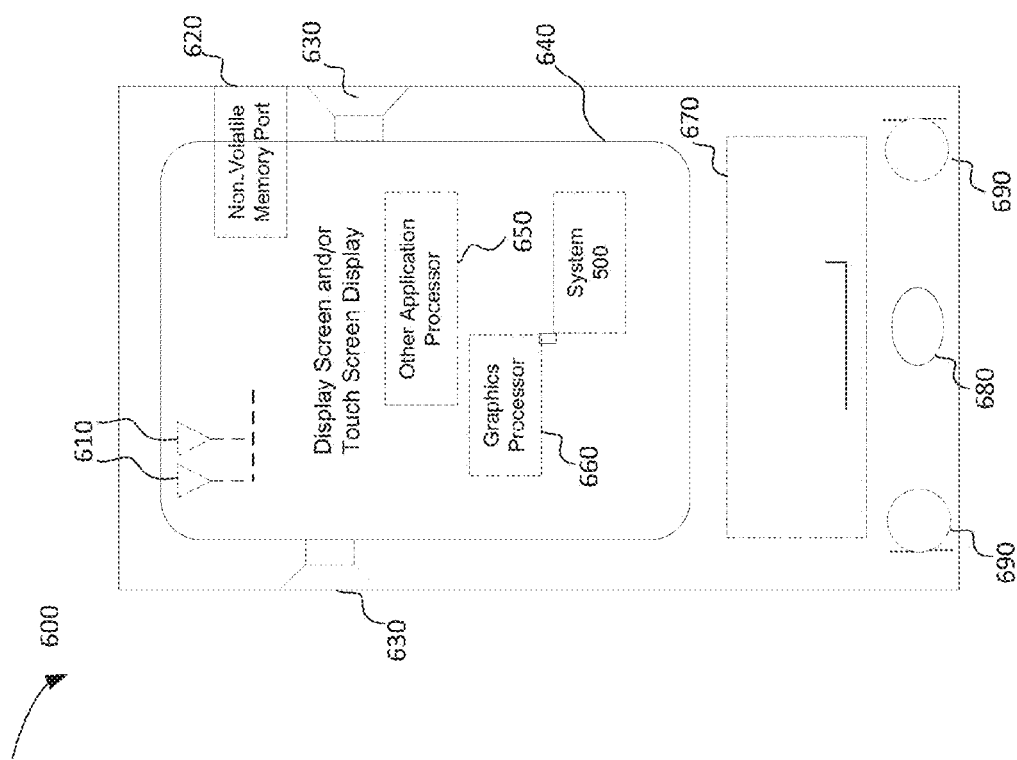
FIG. 14 is a block diagram showing an example wireless apparatus configured for communicating in a wireless network according to one or more of the inventive methods disclosed herein.

FIG. 14 shows an embodiment in which the system 1300 implements a UE in the specific form of a mobile device 1400.

In various embodiments, user interfaces could include, but are not limited to, a display 1440 (e.g., a liquid crystal display, a touch screen display, etc.), a speaker 1430, a microphone 1490, one or more cameras 1480 (e.g., a still camera and/or a video camera), a flashlight (e.g., a light emitting diode flash), and a keyboard 1470.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 660 to communicate with components of a positioning network, e.g., a global positioning system (GPS) satellite.

In various embodiments, the system 1300 may be a mobile computing device such as, but not limited to, a laptop computing device, a tablet computing device, a netbook, a mobile phone, etc. In various embodiments, system 1400 may have more or less components, and/or different architectures.

In embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

EXAMPLES

According to an exemplary embodiment there is provided an RF front-end for transmitting wireless communication signals, the RF front-end comprising a plurality of elements;

and wherein the RF front-end is configured to obtain an RF protection class signal and to selectively apply one or more of the plurality of elements to a transmitted signal based on the obtained RF protection class signal.

According to some exemplary embodiments the RF front-end is configured to obtain the RF protection class signal from a base-band processor.

According to some exemplary embodiments the plurality of elements comprise a plurality of protection elements that provide protection by at least one of: limitation of out-of-band emissions, limitation of spurious emissions, limitation of maximum power output levels, and/or limitation of maximum power spectral density.

According to some exemplary embodiments the plurality of elements comprise one or more of: a high pass filter; a low pass filter; and a band pass filter.

According to some exemplary embodiments the plurality of elements comprise one or more power limiting elements configured to limit output power levels, time domain amplitude levels, power spectral density limits, emission mask limits, spurious emission limits, and/or adjacent channel leakage power ratio limits of a signal output by the RF front-end.

According to some exemplary embodiments the RF protection class signal has a value comprising one of: RF_protection_none; RF_protection_medium; and RF_protection_high.

According to some exemplary embodiments the RF front-end is further configured to apply none of the plurality of elements in response to the RF protection class signal having a value of RF_protection_none.

According to some exemplary embodiments the RF front-end is further configured to selectively apply low-pass filter and band-pass filter protective elements in response to the RF protection class signal having a value of RF_protection_medium.

According to some exemplary embodiments the RF front-end is further configured to selectively apply low-pass filter, band-pass filter, output power limiting and time domain amplitude limiting protective elements in response to the RF protection class signal having a value of RF_protection_high.

According to some exemplary embodiments the RF front-end of claim 1 may further comprise a plurality of multiplexors arranged to selectively enable/disable the plurality of elements based on the RF protection class signal.

According to some exemplary embodiments there is provided a reconfigurable radio device comprising an RF front-end comprising a plurality of elements; and a base band processor comprising a Radio Virtual Machine operable to execute radio configuration software and to output a RF protection class signal representative of a RF protection class associated with the radio configuration software; and wherein the RF front-end is configured to receive the RF protection class signal from the Radio Virtual Machine and to selectively apply one or more of the plurality of elements to a signal based on the obtained RF protection class signal.

According to some exemplary embodiments the plurality of elements comprise a plurality of protection elements that provide protection by at least one of: limitation of out-of-band emissions, limitation of spurious emissions, limitation of maximum power output levels, and/or limitation of maximum power spectral density.

According to some exemplary embodiments the reconfigurable radio device is configured to obtain the RF protection class associated with the radio configuration software from a certification entity.

According to some exemplary embodiments the reconfigurable radio device is configured to be reconfigurable by one of: a firmware update, partly reconfigurable through software, reconfigurable through Radio Virtual Machine code updates.

According to some exemplary embodiments a certification level required to certify the radio configuration software is dependent on the RF protection class associated with the radio configuration software.

According to some exemplary embodiments there is provided a user equipment for use in a wireless network, the user equipment comprising at least one reconfigurable radio device as described above and one or more of: a screen, a speaker, a touchscreen, a keyboard, an antenna array including a plurality of antennas, a graphics processor, or an application processor.

According to some exemplary embodiments there is provided a method comprising executing radio configuration software to configure one or more transceiver functionalities of a reconfigurable radio device generating a RF protection class signal based on an RF protection class associated with the radio configuration software and selectively applying one or more of a plurality of elements to a signal in an RF front-end based on the RF protection class signal.

According to some exemplary embodiments the method may further comprise selectively applying one or more of the plurality of elements to the signal in the RF front-end comprises applying one or more of: a low pass filter; a high pass filter; and a band pass filter.

According to some exemplary embodiments the method may further comprise selectively applying one or more of the plurality of elements to the signal in the RF front-end comprises applying one or more power limiting elements configured to limit output power levels and/or time domain amplitude levels of a signal output by the RF front-end.

According to some exemplary embodiments the plurality of elements comprise a plurality of protection elements that provide protection by at least one of: limitation of out-of-band emissions, limitation of spurious emissions, limitation of maximum power output levels, and/or limitation of maximum power spectral density.

According to some exemplary embodiments there is provided a non-transient computer program product comprising computer program code, configured when executed on a process to implement a method comprising configuring one of more transceiver functionalities of a reconfigurable radio device generating a RF protection class signal based on an RF protection class associated with the radio configuration software and causing one or more of a plurality of elements to be applied to a signal in an RF front-end based on the RF protection class signal.

According to some exemplary embodiments the plurality of elements comprise a plurality of protection elements that provide protection by at least one of: limitation of out-of-band emissions, limitation of spurious emissions, limitation of maximum power output levels, and/or limitation of maximum power spectral density.

The invention claimed is:

1. An RF front-end for transmitting wireless communication signals, the RF front-end comprising:
   power and maximum time domain amplitude limitation circuits; and
   one or more multiplexors
   to:
   obtain a first RF protection class signal that corresponds to a first RF protection class and to provide, based on the first RF protection class signal, a first signal for transmission to the power and maximum time domain amplitude limitation circuits; and obtain a second RF protection class signal that corresponds to a second RF protection class and to cause a second signal for transmission to bypass, based on the second RF protection class signal, the power and maximum time domain amplitude limitation circuits, wherein the first signal is to be provided by a first radio application associated with the first RF protection class and the second signal is to be provided by a second radio application associated with the second RF protection class.

2. The RF front-end of claim 1, wherein the RF front-end is to obtain the first RF protection class signal from a base-band processor.

3. The RF front-end of claim 1, wherein the power and maximum time domain amplitude limitation circuits are to provide protection by limitation of out-of-band emissions, limitation of spurious emissions, limitation of maximum power output levels, or limitation of maximum power spectral density.

4. The RF front-end of claim 1, wherein the power and maximum time domain amplitude limitation circuits comprise a high pass filter; a low pass filter; or a band pass filter.

5. The RF front-end of claim 1, wherein the power and maximum time domain amplitude limitation circuits are to limit output power levels, time domain amplitude levels, power spectral density limits, emission mask limits, spurious emission limits, or adjacent channel leakage power ratio limits of a signal output by the RF front-end.

6. The RF front-end of claim 1, wherein the first RF protection class signal has a value comprising RF_protection_medium or RF_protection_high.

7. The RF front-end of claim 6, wherein the second RF protection class signal has a value comprising RF_protection_none.

8. A reconfigurable radio device comprising:
an RF front-end comprising power and maximum time domain amplitude limitation circuits and one or more multiplexors; and
a base-band processor comprising a Radio Virtual Machine operable to execute radio configuration software and to output a first or second RF protection class signal representative of a first or second RF protection class associated with the radio configuration software; and
wherein the one or more multiplexors are to
receive the first or second RF protection class signal from the Radio Virtual Machine;
if the first RF protection class signal is received, provide a signal for transmission to the power and maximum time domain amplitude limitation circuits; and
if the second RF protection class signal is received, cause the signal for transmission to bypass the power and maximum time domain amplitude limitation circuits.

9. The reconfigurable radio device of claim 8, wherein the power and maximum time domain amplitude limitation circuits provide protection by limitation of out-of-band emissions, limitation of spurious emissions, limitation of maximum power output levels, or limitation of maximum power spectral density.

10. The reconfigurable radio device of claim 8, wherein the reconfigurable radio device is to obtain an indication that the first or second RF protection class is associated with the radio configuration software from a certification entity.

11. The reconfigurable radio device of claim 8, wherein the reconfigurable radio device is to be reconfigurable by a firmware update, partly reconfigurable through software, or reconfigurable through Radio Virtual Machine code updates.

12. The reconfigurable radio device of claim 8, wherein a certification level required to certify the radio configuration software is dependent on the first or second RF protection class associated with the radio configuration software.

13. A user equipment for use in a wireless network, the user equipment comprising:
at least one reconfigurable radio device according to claim 8; and
a screen, a speaker, a touchscreen, a keyboard, an antenna array including a plurality of antennas, a graphics processor, or an application processor.

14. A method comprising:
executing radio configuration software to configure one or more transceiver functionalities of a reconfigurable radio device;
generating a first or second RF protection class signal based on a first or second RF protection class associated with the radio configuration software;
if the first RF protection class signal is generated, providing a signal for transmission to power and maximum time domain amplitude limitation circuits of a radio frequency front-end; and
if the second RF protection class signal is generated, causing the signal for transmission to bypass the power and maximum time domain amplitude limitation circuits.

15. The method of claim 14, wherein the power and maximum time domain amplitude limitation circuits comprise a low pass filter; a high pass filter; or a band pass filter.

16. The method of claim 14, wherein the power and maximum time domain amplitude limitation circuits are to limit output power levels or time domain amplitude levels of a signal output by the RF front-end.

17. The method of claim 14, wherein the power and maximum time domain amplitude limitation circuits are to limit out-of-band emissions, limit spurious emissions, limit maximum power output levels, or limit maximum power spectral density.

18. One or more non-transitory, computer readable media comprising computer program code that, when executed on one or more processors, implements a method comprising:
configuring one of more transceiver functionalities of a reconfigurable radio device;
generating a first or second RF protection class signal based on a first or second RF protection class associated with radio configuration software;
if the first RF protection class signal is generated, providing a signal for transmission to power and maximum time domain amplitude limitation circuits of a radio frequency front-end; and
if the second RF protection class signal is generated, causing the signal for transmission to bypass the power and maximum time domain amplitude limitation circuits.

19. The one or more non-transitory, computer-readable media of claim 18, wherein the power and maximum time domain amplitude limitation circuits provide protection by: limitation of out-of-band emissions, limitation of spurious emissions, limitation of maximum power output levels, or limitation of maximum power spectral density.

* * * * *